W. H. PALMER, Jr.
STORAGE BATTERY CONNECTOR.
APPLICATION FILED MAR. 28, 1917.

1,383,845.  
Patented July 5, 1921.

WITNESS:  
Rob. R. Kitchel

INVENTOR  
William H. Palmer, Jr.  
BY  
ATTORNEY.

UNITED STATES PATENT OFFICE.

WILLIAM H. PALMER, JR., OF WYNCOTE, PENNSYLVANIA, ASSIGNOR TO THE ELECTRIC STORAGE BATTERY COMPANY, OF PHILADELPHIA, PENNSYLVANIA, A CORPORATION OF NEW JERSEY.

STORAGE-BATTERY CONNECTOR.

1,383,845.  Specification of Letters Patent.  Patented July 5, 1921.

Application filed March 28, 1917. Serial No. 157,908.

*To all whom it may concern:*

Be it known that I, WILLIAM H. PALMER, Jr., a citizen of the United States, and a resident of Wyncote, in the county of Montgomery and State of Pennsylvania, have invented a certain new and useful Storage-Battery Connector, of which the following is a specification.

A variety of cable terminal connections are in use with storage bateries and especially with the storage batteries used to furnish power for engine cranking and lighting on gasolene automobiles. These connections differ on cars of different makes and models both in the construction of the cable terminal used and, for a cable terminal of a given construction, in the position in which it must be connected to the battery, and which is determined by the direction from which the cable, which forms a fixed part of the wiring system of the car, approaches the battery compartment. This has led to considerable confusion and expense due to the fact that it has been necessary to supply batteries special as to their connectors to suit the special construction and arrangement of the cable terminals of the various cars.

The principal object of the present invention is to provide a battery connector which can be used to connect a battery to a variety of cable terminals or to the terminals of cables approaching the battery from a variety of directions; or in other words, to provide a battery connector of a more or less universal character.

The invention will be claimed at the end hereof, but will be first described with the embodiment of it chosen for illustration in the accompanying drawings, in which—

Figure 1:
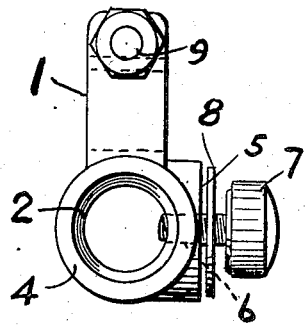
Figure 1, is an end view of a battery connector embodying features of the invention.
Figure 2:
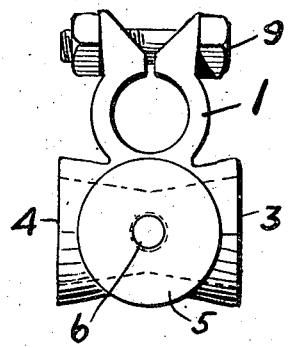
Fig. 2, is a side view, with the cap-screw and washer removed.
Figure 3:
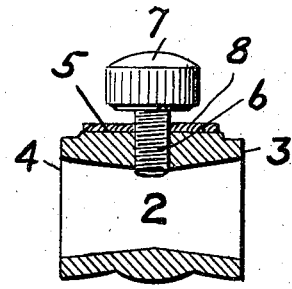
Fig. 3, is a sectional view showing the cap-screw and washer.

In the drawings 1 is a pillar-post clamp and 2, is an internally reversely tapered opening arranged crosswise of the clamp and having faced end walls 3 and 4 and provided upon its body with a face portion 5 tapped as at 6. 7, is a cap-screw and 8 is a washer. The clamp is shown as of the split variety and 9 is a bolt for clamping and unclamping it.

Figure 4:
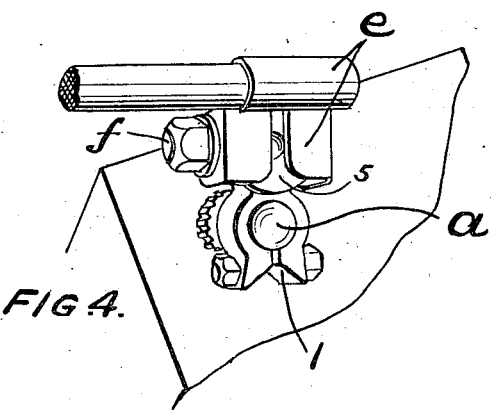
Fig. 4, is a perspective view showing the battery connector in association with one form of conductor or cable terminal or lug.
Figure 5:
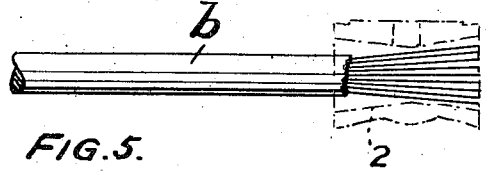
Figs. 5, 6, and 7, are views showing other forms of cable or conductor terminals or lugs with which the battery connector of my invention is adapted for use.
Figure 6:
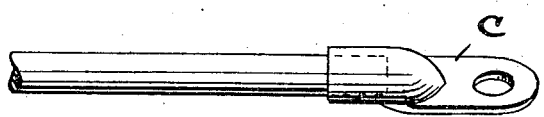
Figure 7:
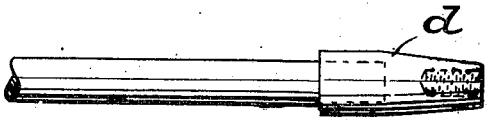

In use the battery connector is applied to the pillar-post *a*, as by means of the clamp 1, and of course the battery connector may be arranged in any required position. If desired the end of a conductor *b* may be bared and inserted through the opening 2 and connected with the terminal by the use of metal that can be poured in while melted, or by the use of the cap-screw 7, or by the use of both of these or equivalent means. Such an arrangement is indicated in Fig. 5. The battery connector may be connected with a cable terminal or lug *c*, of the variety shown in Fig. 6, by placing the part *c* on the face portion 5 and clamping it to place by means of the cap-screw 7. The battery connector may be connected with the type of cable terminal or lug shown in Fig. 7 by placing the plug *d* in the tapered opening 2 and drawing it to place by means of the cap-screw 7 and for this purpose the washer 8 is placed at the end 3 or 4, according as the plug *d* is inserted from the right or left. The type of cable terminal or lug *e*, shown in Fig. 4, is applied over the body of the battery connector and secured to place by the bolt *f* which is a provision of the cable terminal and which passes through the opening 2.

From the foregoing description it is evident that the described battery connector is universal in its application and that it is efficient and comparatively simple and inexpensive to make and apply. It is also evident that certain features of it may be employed without other features.

Obviously modifications may be made without departing from the spirit of the invention hence the latter is not limited to details of construction and the invention is not to be limited otherwise than as the prior state of the art and the appended claims may require.

What I claim is:

1. A storage battery conducting connector comprising a pillar-post split clamp and an internally reversely tapered opening ranging crosswise of the clamp and having faced end walls and provided upon its body with a tapped face portion, and a cap-screw, substantially as described.

2. A storage battery conducting connector comprising a pillar-post split clamp and an internally reversely tapered opening ranging crosswise of the clamp and having faced end walls and provided upon its body with a tapped face portion and a cap-screw, and a washer, substantially as described.

3. A storage battery connector comprising a structure of which the center portion is a clamp for detachably engaging a pillar post and a portion of which is provided with an internally reversely tapered opening.

4. A storage battery connector comprising a portion adapted for application and attachment to a pillar post and a portion having an internally reversely tapered opening and further provided on the body of the last mentioned portion with a tapped face portion.

5. A storage battery connector comprising a portion adapted for application to a pillar-post and a portion having an internally reversely tapered opening and having faced end walls and provided on the body of the last mentioned portion with a tapped face portion.

6. A storage battery connector comprising a structure of which the center portion is a clamp for detachably engaging a pillar post and a portion of which is provided with an internally reversely tapered opening and faced end walls.

WILLIAM H. PALMER, Jr.

Witnesses:
J. H. TRACY,
WM. C. DU BOIS.